United States Patent [19]

Holzenberger

[11] 4,372,337

[45] Feb. 8, 1983

[54] ROTARY DISTRIBUTOR VALVE

[75] Inventor: Kurt Holzenberger, Frankenthal, Fed. Rep. of Germany

[73] Assignee: Klein, Schanzlin & Becker Aktiengesellschaft, Frankenthal, Fed. Rep. of Germany

[21] Appl. No.: 109,922

[22] Filed: Jan. 7, 1980

[30] Foreign Application Priority Data

Jan. 22, 1979 [DE] Fed. Rep. of Germany ....... 2902364

[51] Int. Cl.³ .............................................. F16K 5/08
[52] U.S. Cl. ........................................ 137/240; 37/58; 37/DIG. 8; 134/109; 137/874; 137/876; 406/105
[58] Field of Search ................... 137/15, 240, 625.47, 137/874, 876; 134/22 C, 109, 110; 406/105, 109, 182; 37/58, DIG. 8, 59

[56] References Cited

U.S. PATENT DOCUMENTS

| 2,315,058 | 3/1943 | Holt et al. ........................ 137/240 |
| 2,800,365 | 7/1957 | Hodges .......................... 137/625.47 |
| 2,996,083 | 8/1961 | Huska ............................ 137/625.47 |
| 3,378,310 | 4/1968 | Christensen .................... 406/109 |
| 3,424,501 | 1/1969 | Young ............................ 406/109 |
| 3,485,534 | 12/1969 | Wonzeuberg et al. ........... 406/109 |
| 3,753,303 | 8/1973 | Holzenberger et al. .......... 406/109 |
| 3,842,522 | 10/1974 | Holzenberger et al. .......... 406/109 |
| 3,982,789 | 9/1976 | Funk .............................. 406/105 |
| 4,154,484 | 5/1979 | Holzenberger ................... 406/109 |

Primary Examiner—Martin P. Schwadron
Assistant Examiner—G. L. Walton
Attorney, Agent, or Firm—Peter K. Kontler

[57] ABSTRACT

The housing of a distributor valve has a first inlet for admission of a liquid which is maintained at a first pressure, a second inlet for admission of a liquid which is maintained at a higher second pressure, and at least two outlets. The cylindrical valving element has a first passage, one end of which is in permanent communication with the first inlet and the other end of which can be moved into register with a selected outlet in response to rotation of the valving element. The latter has a second passage, one end of which is in permanent communication with the second inlet and the other end of which registers with an outlet other than that which is in register with the other end of the first passage. The second passage and/or the second inlet admits highly pressurized flusing liquid into the clearances between the housing and the valving element to prevent penetration of liquid which is admitted via first inlet. The liquid which flows through the first passage contains solid particles, such as fragments of ore. The first passage resembles an elbow and extends along an arc of less than 46 degrees. The cross-sectional area of the first passage is constant and matches that of the first inlet as well as that of each outlet.

12 Claims, 3 Drawing Figures

ROTARY DISTRIBUTOR VALVE

BACKGROUND OF THE INVENTION

The present invention relates to valves in general, and more particularly to valves (hereinafter also called rotary distributor valves) wherein the valving element can be indexed in the housing or body to direct a single stream of incoming fluid into any one of several outlets or to direct fluid from any one of several inlets into a single outlet. Still more particularly, the invention relates to improvements in valves wherein the valving element can be adjusted to connect a pair of inlets with selected outlets or to connect a selected one of several outlets with an inlet, for example, to convey a stream of liquid which contains solid particles from the bottom of a body of water to the surface.

It is well known that the components of pipe lines and valves which are used to lift solid particles from the sea bottom undergo extensive wear as a result of frictional engagement with the solids in a liquid stream. The extent of erosion progresses with increasing speed of the liquid carrier medium, and the erosion is concentrated primarily in those areas where the solid particles are forced against the internal surfaces of pipe lines and/or valves under the action of gravity and/or centrifugal forces. On the other hand, underwater valves and pipe lines should be capable of standing long periods of use without any inspection and/or maintenance, especially when they are used in systems of the type disclosed, for example, in the commonly owned U.S. Pat. Nos. 3,753,303 and 3,842,522 respectively granted on Aug. 21, 1973 and Oct. 22, 1974 to Holzenberger et al. The disclosures of these patents are incorporated herein by reference. Many valves of the system which is disclosed in the patents to Holzenberger et al. are continuously traversed by streams of water which carries particles of ore or other solid substances. Note the valves 18, 19 in FIGS. 3 and 4 of the patents to Holzenberger et al. Therefore, such valves must be designed to enable their components to stand long periods of use because they are not readily accessible and any attempts to inspect and/or replace their parts would entail prolonged interruptions of the underwater mining operation. Solid particles are especially likely to accumulate in narrow clearances between stationary and moving parts, e.g., between the housing and the valving element of a valve. The liquid carrier medium cannot properly rinse such clearances so that any particles of ore which enter the clearances are likely to remain therein and to cause rapid wear upon the adjacent surfaces of the stationary as well as movable parts. Solid particles are further likely to accumulate in so-called dead spaces or in regions where the speed of the liquid carrier medium is reduced due to the design of surfaces surrounding the path for the flow of liquid which contains solid particles.

OBJECTS AND SUMMARY OF THE INVENTION

An object of the invention is to provide a novel and improved distributor valve which can be used for regulation of the flow of solid particles in a liquid carrier medium and which is more resistant and more immune to wear than heretofore known valves of similar character.

Another object of the invention is to provide a distributor valve which can stand long periods of uninterrupted use, which can be used to cyclically change the destination of conveyed fluids or to connect a fluid-removing conduit with any one of several supplying conduits, and which can be used in existing underwater mines or for analogous purposes as a superior substitute for heretofore known valves.

An additional object of the invention is to provide a novel housing and a novel valving element for use in a valve of the above outlined character.

A further object of the invention is to provide a valve wherein all clearances can be readily rinsed with a fluid which is free of solid contaminants and wherein the paths for the flow of fluids are designed in such a way that the surfaces bounding the paths cannot be readily attacked by solid particles under the action of gravity and/or centrifugal force.

Another object of the invention is to provide a valve wherein the entire stream of a liquid carrier medium for solid ingredients is caused to flow at a selected speed to thus reduce the likelihood of deposition of solid particles in certain areas of the path along which the medium is conveyed through the valve.

An ancillary object of the invention is to provide a valve which can be used with advantage in systems which raise particulate material from the sea bottom or from accumulations below other bodies of liquid.

The invention is embodied in a valve for connecting a first conduit with a selected one of several second conduits. The valve comprises a housing or body having a first opening communicating with the first conduit (such first opening may constitute a first inlet if the first conduit serves to deliver a stream of liquid to the housing, e.g., a stream of liquid carrier medium for particles of ore or other solid material), a second opening and a plurality of third openings (such third openings constitute outlets if the first opening is an inlet) each communicating with a different second conduit. The valve further comprises a valving element which is rotatable in the housing. The valving element has a first passage including a first open end which is in permanent communication with the first opening of the housing and a second open end which is movable into register with a selected third opening in response to rotation of the valving element in the housing. Furthermore, the valving element includes a second passage having a first open end in permanent communication with the second opening (which may constitute an inlet for highly pressurized flushing liquid) and a second open end registering with one of the third openings when the second open end of the first passage registers with another third opening.

The housing preferably comprises relatively thin partitioning means between the third openings, and the valving element preferably comprises relatively thin partitioning means between the second open ends of the passages so that the effective cross-sectional area of the second open end of the first passage remains substantially unchanged during rotation of the valving element in the housing to move the second open ends into register with different third openings. The valving element, or at least a portion thereof, may constitute a circular cylinder having a first end face which is provided with the first open end of the first passage, a peripheral surface which is provided with the second opening, and a second end face which is provided with the second ends of the passages.

The first passage is preferably of arcuate shape. In accordance with a presently preferred embodiment of the invention, the first passage resembles an elbow extending along an arc of not more than 45 degrees (i.e., less than 46 degrees). This ensures that the surface surrounding the first passage is less likely to be attacked by fragments of solid material under the action of centrifugal force. The cross-sectional areas of the open ends of the first passage preferably equal or approximate the cross-sectional areas of the first and third openings. This reduces the likelihood of changes in speed of the conveyed liquid during flow through the valve.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
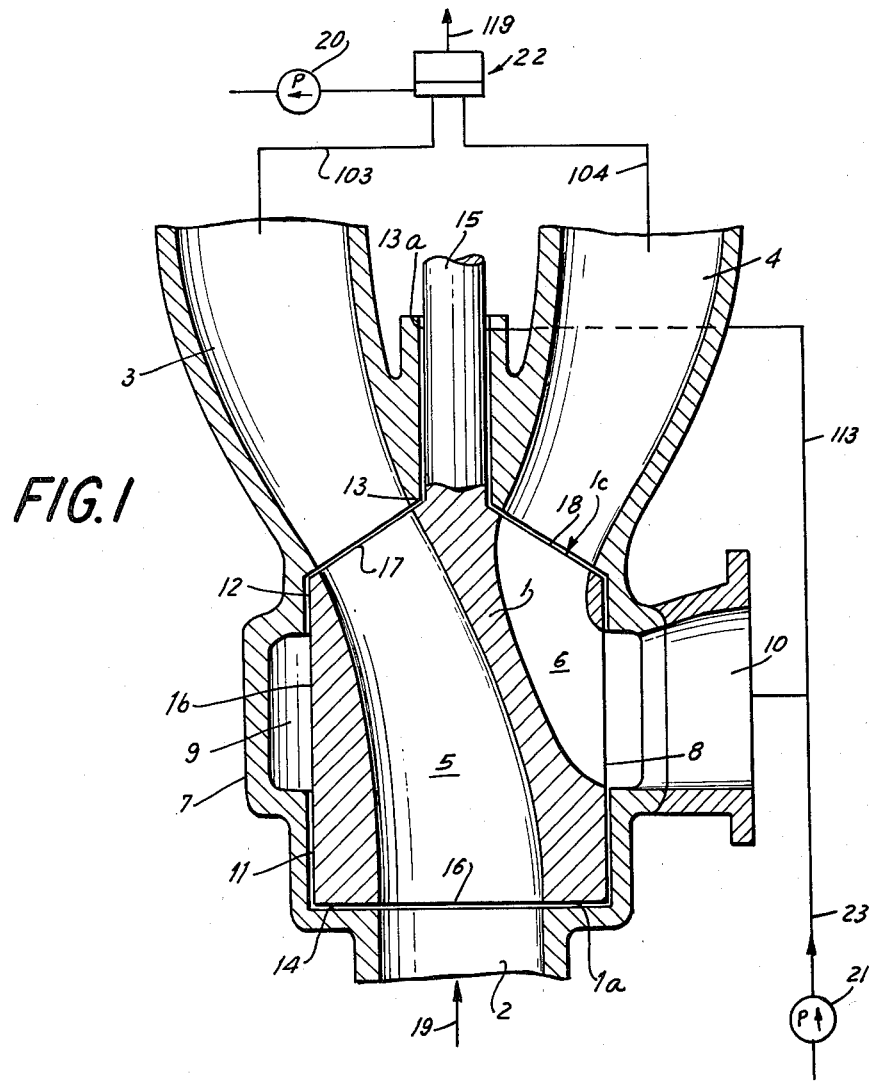
FIG. 1 is an axial sectional view of a valve which embodies one form of the invention and whose housing has two outlets.

Referring first to FIG. 1, there is shown a distributor valve which comprises a hollow substantially cylindrical housing 7 and a rotary valving element 1 in the housing. The housing 7 has a first opening 2 which is an inlet and is connected with the discharge end of a first conduit 19 constituting a riser, a second opening 10 which is also an inlet and is connected with the discharge end of a conduit 23 receiving pressurized fluid from a source 21, e.g., a water pump, and several third openings 3, 4 which constitute outlets and are respectively connected with conduits 103, 104. It is assumed that the conduit 19 admits into the inlet 2 a dispersion of solid particles in water and that the conduit 23 admits into the inlet 10 a stream of flushing water at a pressure exceeding the pressure of fluid in the inlet 2. The inlet at the lower end of the conduit 19 can be located at the bottom of a body of water, e.g., sea, and the particles which are dispersed in the stream of water rising in the conduit 19 may constitute fragments of ore which is to be raised above the sea level substantially in a manner as disclosed in the aforementioned U.S. Pat. Nos. 3,753,303 and 3,842,522 to Holzenberger et al.

The valving element 1 is rotatable by a drive shaft 15 which indexes the valving element at required intervals so as to establish communication between the inlet 2 and a selected one of the outlets 3, 4 while simultaneously establishing communication between the inlet 10 and the other outlet of the housing 7. The lower portion of the valving element 1 is a circular cylinder having a flat end face or bottom face 1a and a cylindrical peripheral surface 1b. The upper or second end face 1c of the valving element 1 is conical and is disposed opposite the end face 1a. The valving element 1 is formed with a first passage 5 whose open lower end 16 is in permanent communication with the inlet 2 and is located substantially centrally of the end face 1a, and whose open upper end 17 has a substantially semicircular outline (see FIG. 2) and is provided in the upper end face 1c. A second passage 6 of the valving element 1 has a first open end 8 in the peripheral surface 1b; this open end is in permanent communication with the inlet 10 because the housing 7 has an internal channel 9 which surrounds the peripheral surface 1b of the valving element 1 and ensures that the liquid which is delivered by the conduit 23 invariably enters the passage 6. The open upper end 18 of the passage 6 is provided in the end face 1c and is mirror symmetrical to and equally large and similar in shape to the open end 17 of the passage 5.

FIG. 1 further shows several relatively narrow clearances or gaps 11, 12, 13, 14 which are defined by the housing 7 and valving element 1. These clearances are continuously rinsed by liquid which is supplied by the conduit 23 and whose pressure exceeds the pressure of liquid in the conduit 19, inlet 2, passage 5 and that one of the outlets 3, 4 which happens to communicate with the passage 5. This guarantees that solid particles which are contained in the liquid supplied by the conduit 19 cannot penetrate into the clearances 11 to 14, i.e., the just described arrangement prevents rapid wear upon the stationary and mobile components of the improved valve by preventing the entry of solids-containing liquid into the clearances 11–14. The clearance 14 is provided below the end face 1a of the cylindrical portion of the valving element 1; the clearance 11 is disposed between the lower part of the peripheral surface 1b and the corresponding part of the internal surface of the housing 7 (at a level below the channel 9 and inlet 10); the clearance 12 is provided between the upper part of the peripheral surface 1b and the adjacent portion of the internal surface of the housing 7 (at a level above the channel 9 and inlet 10); and the clearance 13 is provided between the conical end face 1c of the valving element 1 and the adjacent internal surface of the housing 7. The clearance 13 further includes a portion 13a which extends between the housing 7 and the drive shaft 15 which is coaxial with the cylindrical portion of the valving element 1 and serves to index the latter at requisite intervals and in a selected direction. If desired, the portion 13a of the clearance 13 can be connected with the inlet 10, conduit 23 or channel 9 by an auxiliary line 113 which causes the solids-containing liquid (if any) to leave the portion 13a by being expelled into the outlet 3 or 4. It is equally possible to employ a separate pump (not shown) for delivery into the line 113 of a liquid which is free of solid particles and is maintained at such pressure that the liquid invariably flows from the interior of the portion 13a and into the outlet 3 or 4, i.e., that the portion 13a is rinsed in the same way as the other part of the clearance 13 and the clearances 11, 12, 14 in order to remain free of solid particles.

The means for rotating the shaft 15 to thereby index the valving element 1 may include a submerged (encapsulated) electric motor, a hydraulic motor, a pneumatic motor or any other suitable prime mover.

The passage 5 in the valving element 1 resembles an elbow whose curvature is less than 46 degrees. This is desirable and advantageous because the surface surrounding the passage 5 is less likely to be attacked by solid particles under the action of centrifugal force. Moreover, the particles which travel upwardly from the conduit 19 into the conduit 103 or 104 are less likely to rebound on impact against the surface surrounding the passage 5 because the extent to which such particles are deflected from a straight path is relatively small.

Figure 3:
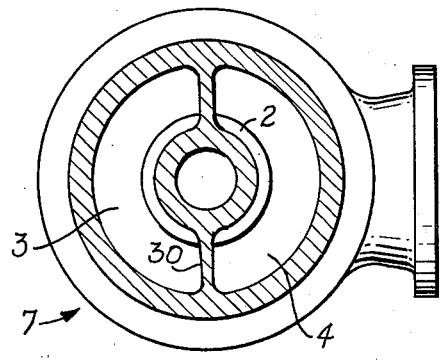
FIG. 3 is a horizontal sectional view of the housing of the valve shown in FIG. 1.

FIG. 1 further shows a second valve 22 which can be a mirror image of (inverted) valve including the element 1 and housing 7. The valve 22 can serve to convey a stream of solids-containing liquid from the conduit 103 or 104 into a second riser 119 serving to convey the solids-containing liquid stream to the surface. Reference may be had to FIGS. 3 and 4 of the aforementioned patents to Holzenberger et al. A suction pump 20 communicates with the conduit 103 or 104 via valve 22 to cause a stream of liquid (such stream contains solid particles) to flow from the bottom of the sea, through the conduit 19, inlet 2, passage 5 and conduit 103 or 104 to enter the riser 119 via valve 22. The pump 20 is operated in such a way that the pressure of liquid in the conduit 19 and passage 5 is less than the pressure of flushing liquid which is supplied by the pump 21.

When the valve is in use, the liquid flushing medium which is supplied by the conduit 23 causes the valving element 1 to float in the liquid which fills the clearances 11-14. Such liquid flows through the clearances so as to prevent entry of solid particles into the clearances. The same result can be achieved (in the absence of the pump 21 and conduit 23) if the clearances 11-14 are connected with a source of stagnant pressurized flushing liquid which escapes from the clearances in a direction toward the outlets and thus prevents penetration of solid particles into the clearances.

The operation is as follows:

The open lower end 16 of the passage 5 is in permanent communication with the inlet 2, i.e., with the discharge end of the conduit 19, so that it receives a continuous stream of a liquid which carries fragments of a solid material, e.g., particles of ore which is to be lifted off the sea bottom. The open upper end 17 of the passage 5 is in communication with the outlet 3, i.e., with the conduit 103. The open lower end 8 of the second passage 6 is in permanent communication with the inlet 10 and hence with the supply conduit 23 for pressurized liquid which is free of solid particles and is delivered by the pump 21. The open upper end 18 of the second passage 6 communicates with the outlet 4, i.e., the pressurized flushing liquid flows into the conduit 104 and expels therefrom a column of solids-containing liquid whereby such column passes through the valve 22 and enters the riser 119. The solids-containing liquid which is delivered by the conduit 19 is in the process of forming a column in the conduit 103 by expelling from this conduit a column of flushing liquid in response to the action of the pump 20 which sucks liquid from the upper end of the conduit 103 via valve 22. When the aforementioned column of liquid which contains solid particles fills the conduit 103, the prime mover is actuated to rotate the shaft 15 and to thereby index the valving element 1 so that the open ends 17, 18 of the passages 5, 6 respectively register with the outlets 4 and 3. The flushing liquid which is supplied by the pump 21 then expels the column of solids-containing liquid from the conduit 103 into the riser 119, and the conduit 19 delivers a column of solids-containing liquid into the conduit 104.

In order to reduce the likelihood of turbulence or other irregularities in the flow of liquids into and from the passages 5 and 6, the cross-sectional area of the inlet 2 preferably equals the cross-sectional area of the open lower end 16 of the passage 5, the open upper end 17 of this passage, the outlets 3 and 4, the inlet 10, and the open ends 8, 18 of the passage 6. This ensures that the velocity of liquid which is supplied by the conduit 19 and contains solid particles varies very little or not at all. Moreover, the design of the improved valve is such that there are no dead corners for deposition of solid particles therein, and the valve is also characterized by the absence of any configurations which would cause a slowdown of the speed of liquid in certain parts of the valve. This, too, reduces the likelihood of wear because the possibility of deposition of solid particles in certain parts of the valve is practically nil. As mentioned above, the curvature of the elbow-shaped passage 5 is preferably less than 46 degrees to further reduce the likelihood of rapid wear upon the valve, namely, upon the valving element 1. As shown in the drawing, the angle of curvature of the passage 5 can be substantially less than 45 degrees. This holds true regardless of whether the housing has two outlets (as shown) or three or more outlets (as disclosed in the aforementioned patents to Holzenberger et al.).

Figure 2:
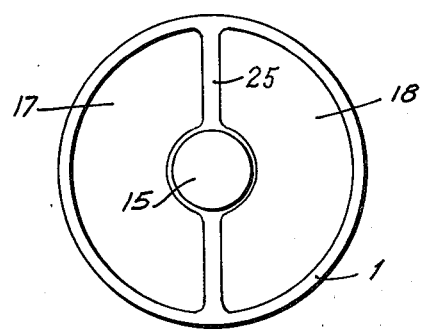
FIG. 2 is a plan view of the valving element of the valve shown in FIG. 1.

FIG. 2 shows that the cross-sectional areas of the open ends 17, 18 of the two passages 5, 6 in the valving element 1 are not only similar but actually identical to each other, not only as concerns their size but also as concerns their shape. In fact, these open ends are mirror symmetrical to each other with reference to a plane including the common axis of the shaft 15 and the cylindrical portion of the valving element 1. Since the housing 7 has only two outlets 3 and 4, the open ends 17, 18 of the respective passages 5, 6 extend along arcs of approximately 180 degrees, as considered in the circumferential direction of the valving element 1. The web or partition 25 between the open ends 17, 18 is preferably very thin so that the effective cross-sectional areas of the open ends 17, 18 vary very little while the valving element 1 is indexed to move the passage 5 into register with the outlet 3 or 4. The housing 7 has a partition or web 30 (see FIG. 3) which is similar to the partition 25. The partition 30 extends at right angles to the plane of FIG. 1. The partitions 25 and 30 are subjected to pronounced stresses when the valving element 1 is indexed, namely, they are impinged upon by solid particles which flow through the passage 5 and into the outlet 3 or 4. Such impingement is rather abrupt if the valving element 1 is indexed at a relatively high speed. Therefore, the partitions 25 and 30 are preferably made of or coated with a highly wear-resistant material to guarantee long useful life of the valve and to eliminate the need for frequent inspection or maintenance. The partitions 25 and 30 are subjected to pronounced stresses on the additional ground that the pressure differential between the liquids in the passages 5 and 6 is preferably high.

If the valve which embodies the invention has three or more outlets, the open ends of the passages in that end face of the valving element which is adjacent to the outlets extend along arcs of 120, 90, etc. degrees.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A valve for connecting a first conduit which delivers a first fluid with a selected one of several second conduits, comprising a housing having a first opening constituting a first inlet and communicating with the first conduit, a second opening constituting a second inlet, and a plurality of third openings each constituting an outlet and each communicating with a different one of said second conduits; a valving element rotatable in said housing and having a first passage including a first open end in permanent communication with said first opening and a second open end movable into register with a selected third opening in response to rotation of said valving element in said housing, and a second passage having a first open end in permanent communication with said second opening and a second open end registering with one of said third openings when the second open end of said first passage registers with another of said third openings, said valving element further having a peripheral surface and at least one additional surface and defining with said housing a plurality of clearances adjacent to said surfaces and communicating with said second opening and with said second passage; and means for admitting a second fluid into said housing via said second opening whereby said second fluid penetrates into and continuously rinses said clearances.

2. The valve of claim 1, wherein at least a portion of said valving element is a cylinder.

3. The valve of claim 1, wherein said housing further comprises relatively thin partitioning means between said third openings so that the effective cross-sectional area of the second open end of said first passage remains substantially unchanged during rotation of said valving element in said housing to move said second open ends into register with different third openings.

4. The valve of claim 1, wherein said first passage has an arcuate shape.

5. The valve of claim 4, wherein said first passage is an elbow extending along an arc smaller than 46 degrees.

6. The valve of claim 1, wherein said valving element includes a cylindrical portion having an end face constituting said additional surface, the first open end of said first passage being disposed substantially centrally of said end face.

7. The valve of claim 6, wherein said valving element has a second end face substantially opposite said end face of said cylindrical portion and the second open ends of said passages are provided in said second end face.

8. The valve of claim 7, wherein the cross-sectional areas of the second open ends of said passages are similar to each other in shape as well as size.

9. The valve of claim 8, wherein the second open ends of said passages are immediately adjacent to each other.

10. The valve of claim 8, wherein the second open ends of said passages are mirror symmetrical to each other with reference to the axis of said cylindrical portion.

11. The valve of claim 1, wherein the first open end of said second passage is provided in said peripheral surface.

12. The valve of claim 11, wherein said housing has internal channel means communicating with said second opening and with the first open end of said second passage.

* * * * *